United States Patent [19]

Keritsis

[11] 4,302,308

[45] Nov. 24, 1981

[54] METHOD FOR ELECTROLYTIC DENITRATION OF TOBACCO

[75] Inventor: Gus D. Keritsis, Richmond, Va.

[73] Assignee: Philip Morris, Inc., New York, N.Y.

[21] Appl. No.: 216,803

[22] Filed: Dec. 16, 1980

Related U.S. Application Data

[63] Continuation-in-part of Ser. No. 127,479, Mar. 5, 1980, Pat. No. 4,253,929.

[51] Int. Cl.$^3$ ............................................. B01D 13/02
[52] U.S. Cl. ............................... 204/180 P; 204/301; 131/298
[58] Field of Search ........................... 204/180 P, 301; 131/143

[56] References Cited

U.S. PATENT DOCUMENTS

| | | | |
|---|---|---|---|
| 3,493,488 | 2/1970 | Sisk | 204/301 |
| 3,616,801 | 11/1971 | Hind | 131/143 |
| 3,645,884 | 2/1972 | Gilliland | 204/301 |
| 3,686,089 | 8/1972 | Korngold et al. | 204/180 P |
| 3,755,135 | 8/1973 | Johnson | 204/301 |
| 3,847,164 | 11/1974 | Mattina et al. | 131/143 |
| 3,869,376 | 3/1975 | Tejeda | 204/301 |
| 4,131,117 | 12/1978 | Kite et al. | 131/140 |
| 4,131,118 | 12/1978 | Gellatly et al. | 131/140 |

*Primary Examiner*—Arthur C. Prescott
*Attorney, Agent, or Firm*—Arthur I. Palmer, Jr.

[57] ABSTRACT

An improved process for denitrating tobacco with minimal losses of desirable tobacco solubles employing electrodialysis is disclosed. The process comprises subjecting an aqueous tobacco extract to membrane electrodialysis such that nitrate salts are extracted, without substantial loss of desirable tobacco solubles, while minimizing conflicting reactions in the electrodialysis unit and prolonging membrane life. Conflicting reactions are reduced and membrane life is enhanced by isolation of the electrodes to prevent electrolysis in the extract and brine by use of an anion permeable membrane adjacent the cathode and by use of a catholyte, the anion of which forms soluble salts with polyvalent cations. The denitrated extract when combined with denitrated insoluble fibrous tobacco materials may be employed to produce tobacco products having reduced nitrogen oxide delivery.

11 Claims, 3 Drawing Figures

METHOD FOR ELECTROLYTIC DENITRATION OF TOBACCO

This application is a continuation-in-part of prior copending application Ser. No. 127,479, now U.S. Pat. No. 4,253,929 filed Mar. 5, 1980.

BACKGROUND OF THE INVENTION

1. Field of the Invention

This invention relates to a method for denitrating tobacco extract via electrodialysis.

2. Description of the Prior Art

Tobacco contains a number of nitrogen containing substances which during the burning of the tobacco yield various components in the smoke. Removal of some of these smoke components, such as the oxides of nitrogen, is considered desirable.

Nitrate salts, such as potassium, calcium and magnesium nitrates, are a major class of nitrogenous substances which are precursors for nitrogen oxides, especially citric oxide. These nitrate salts are normally found in great abundance in burley tobacco stems and strip and to a lesser degree in flue-cured tobacco stems and in reconstituted tobaccos which utilize these components. Attempts have been made to reduce or remove the nitrate from these tobaccos to bring about a significant reduction in the oxides of nitrogen delivered in their smoke. Among the techniques which have been employed to this end are extraction methods whereby the nitrates are removed from the tobacco material.

In accordance with extraction techniques, tobacco materials are generally contacted with water. In this manner, an extract containing the tobacco solubles including the nitrate salts, is formed. The extract is collected and may be discarded or may be treated to remove the nitrate ions. The denitrated extract may thereupon be reapplied to the fibrous insoluble tobacco material from which it was originally removed.

For example, U.S. Pat. Nos. 4,131,118 and 4,131,117 describe denitration of an aqueous tobacco extract by crystallizing the nitrate as potassium nitrate followed by reapplication of the denitrated extract to the tobacco. In U.S. Pat. No. 3,847,164 denitration of tobacco extracts is effected by means of ion-retardation resins which retard ionic material, specifically potassium nitrate, while non-ionic constituents in the tobacco extracts pass unaffected. In the practice of this method rapid neutralization of the resins results, necessitating plant shutdown for regeneration employing costly chemical treatments.

In addition to denitration, extraction processes are employed to remove other components from tobacco. For example, U.S. Pat. No. 3,616,801 describes a process for improving the tobacco burn properties, smoke flavor and ash by controlling the ion content of the tobacco. In accordance with the process therein disclosed the proportion of metallic ions in an aqueous tobacco extract is adjusted, followed by reapplication of the treated extract to the tobacco. Among the treatments suggested for adjusting the metal ion content are ion exchange and membrane electrodialysis. Removal of potassium ions and their replacement with ammonium, hydrogen, calcium or magnesium ions are particuarly desirable in the practice of this process. Other ions, including nitrate, may also be removed to improve the tobacco properties. In Example 6, substantial quantities of various tobacco solubles, including both nitrate and potassium ions, were removed by means of electrodialysis.

Parent application Ser. No. 127,479, now U.S. Pat. No. 4,253,929 describes nitrate removal from tobacco extract by means of electrodialysis, whereby a substantial reduction in nitrate salts is achieved with minimal loss of other tobacco solubles. It has now been discovered that it is possible to minimize conflicting reactions and salt precipitation in the electrodialysis unit and thus prolong the useful life of the electrodialysis membranes during such denitration.

SUMMARY OF THE INVENTION

The present invention provides a method for maximizing the removal of nitrates from tobacco extracts, while minimizing the removal of other desirable tobacco solubles in a manner which minimizes precipitation of insoluble salts and hydroxides of polyvalent cations. Prolonged membrane life and more uniform denitration of tobacco extract are thus possible.

In accordance with the present invention, the method of selectively denitrating tobacco wherein an aqueous tobacco extract having a solids content of about 5-50% and a resistivity of about 8-50 ohm-cm is rapidly circulated through the alternate cells of an electrodialysis unit which comprise an anion permeable membrane toward the anode spaced no more than about 0.04 inches from an anion impermeable membrane toward the cathode while circulating brine in the remaining cells and applying about 0.5 to about 2.0 volts/cell pair is improved by isolating the electrodes from all elements of the unit which are in direct electrolytic contact with the opposite electrode, providing a cell having an anion permeable membrane toward the catholyte and employing an electrolyte the anion of which forms soluble salts with polyvalent cations. A further improvement in the process comprising circulating brine solution through the cells adjacent both electrolyte solutions. Extract treated in accordance with the invention may then be applied to fibrous tobacco materials from which the tobacco solubles have been extracted. Smoking products containing tobacco which has been treated in this manner deliver substantially reduced levels of nitrogen oxides during combustion.

DETAILED DESCRIPTION OF THE INVENTION

Figure 1:
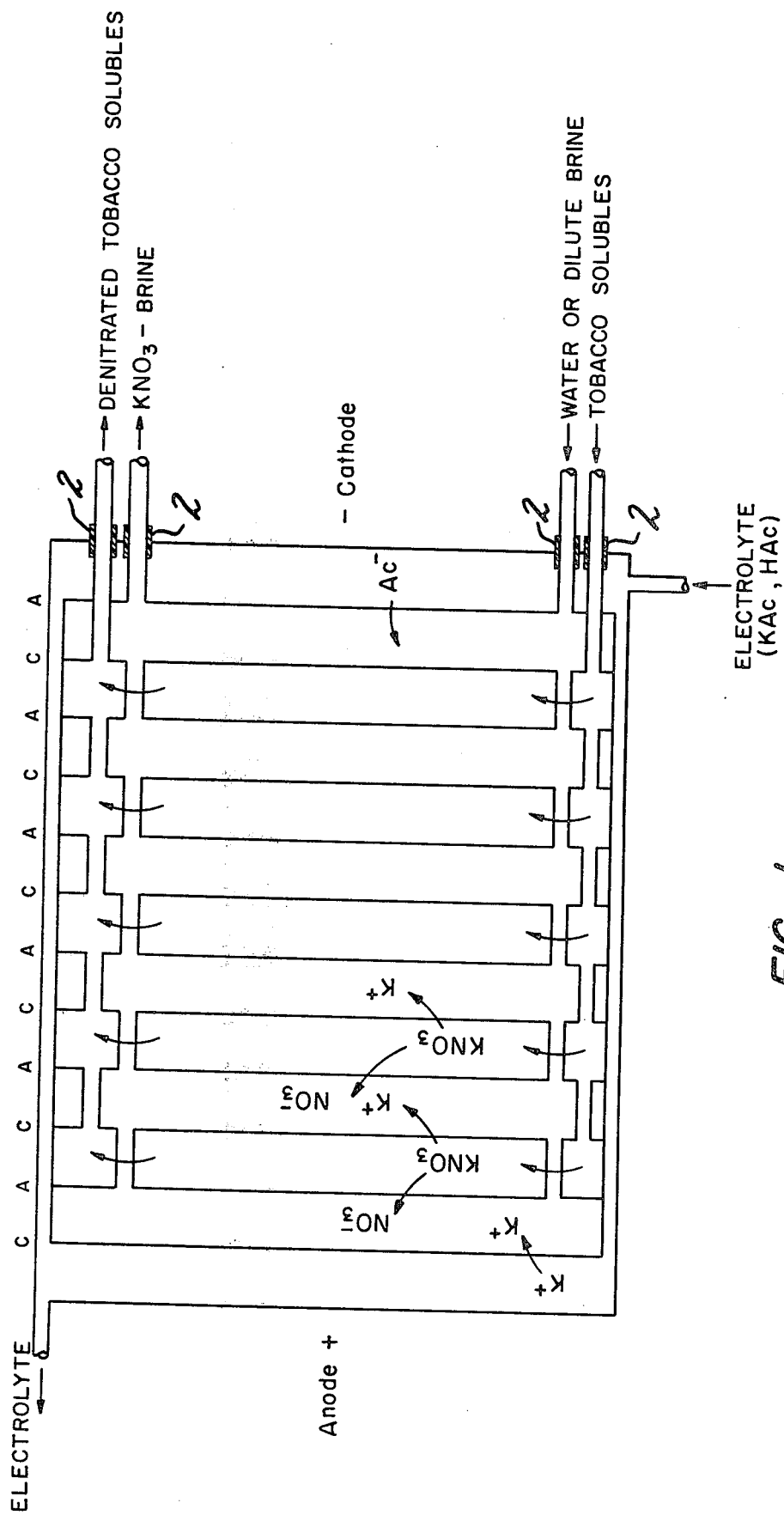
FIG. 1 is a schematic diagram of an electrodialysis stack for selectively removing nitrate salts from tobacco extracts in accordance with the preferred embodiment of the invention.

Copending parent application Ser. No. 127,479, now U.S. Pat. No. 4,253,929 describes an electrodialytic method for denitrating tobacco extracts wherein substantial removal of nitrate salts from tobacco material is effected, with minimal removal of other solubles present in the tobacco material. In accordance with the present invention denitration of tobacco extracts by means of membrane electrodialysis is effected with minimal salt precipitation and with greater control of temperature fluctuations. By means of this method substantially enhanced membrane life can be achieved.

In the practice of the process, an aqueous tobacco extract which contains 5-50% solids content, and a resistivity of 8-50 ohm-cm, is formed. An extract containing 10-40% solids and having a resistivity of 10-45 ohm-cm is preferred. Conventionally, such an extract may be produced by contacting a tobacco material with an aqueous solution in order to extract the soluble components, including nitrate salts. The aqueous solution employed may be water or preferably a denitrated aqueous extract of tobacco containing tobacco solubles. The extraction can be effected using 5:1 to 100:1 aqueous solution to tobacco ratio (w/w) at 20°-100° C., preferably 60°-95° C., generally for a period of time ranging from a few seconds to several minutes depending on the particular temperature and volume of water or solubles used, although longer periods may be employed.

The aqueous tobacco extract is separated from the insoluble fibrous tobacco residue, employing conventional solid-liquid separation techniques. For example, pressing, centrifugation and filtration techniques may be employed. In general, to maximize the extraction of nitrate salts, the wetted tobacco is pressed or centrifuged, at the end of the extraction time to remove the excess water and residual nitrate salts that may be present on the tobacco surface and in suspension. By employing this mode of operation the need for excessive drying of the tobacco to remove excess moisture can also be avoided.

If necessary the separated tobacco extract is treated to achieve the desired solids content and resistivity. Further, the tobacco extract may be subjected to centrifugation and/or ultrafiltration to aid in maintenance of uniform flow through the electrodialysis cells by removing large solid particles and colloidal substances that may plug the closely spaced cells. Since removal of suspended colloidal materials reduces viscosity of the tobacco solubles, the amount of membrane coating or fouling is reduced, thus improving efficiency of both the denitration by and operation of the electrodialysis unit.

Following such treatments, the extract is subjected to electrodialysis employing conditions such that maximum removal of nitrate salts with minimal removal of desirable tobacco solubles is effected in a commercially practical manner. The conditions required to effect selective removal of nitrate salts with minimal removal of other solubles from the extract are fully described hereinbelow. As a general rule, however, electrodialysis in accordance with the present invention entails rapid circulation of the extract through electrodialysis cells comprising closely spaced anion permeable and anion impermeable membranes while applying a low voltage.

Following the electrodialytic denitration of the tobacco extract, the extract is recombined with the insoluble tobacco material from which it was removed. Where some potassium ions, as well as nitrate ions, have been removed from the extract, it is preferable to restore the potassium level by addition of a potassium salt, other than potassium nitrate, prior to reapplication to the tobacco in order to maximize the reduction of nitrogen oxide delivery during combustion. Alternatively, such potassium salts may be added directly to the extracted tobacco. Among the potassium salts suitable for this purpose are potassium phosphate, acetate, citrate, malate and carbonate.

Prior to reapplication the extract may be concentrated if necessary or desired. This may be accomplished by evaporation methods, such as thin film flash evaporation, reverse osmosis or ultra-microfiltration, as well as other conventional concentration techniques. The reapplication may be effected by any suitable means such as spraying, coating, dipping or slurry processes. Following reapplication the tobacco may be dried or otherwise processed to put it in condition for use in tobacco products. Thereupon treated tobacco may be used in any smoking tobacco product desired. Any such smoking tobacco product will exhibit reduced delivery of nitrogen oxides during combustion.

In a membrane electrodialysis set-up, the membranes are arranged in stacks which are disposed between an anode and a cathode. By selection of the appropriate sequence of membranes, the nitrate ions in the extract can be removed either as potassium nitrate or selectively as $NO_3^-$, leaving the potassium ions substantially intact. Alternatively, if desired, metallic ions, such as potassium, may be selectively removed by modifying the membrane arrangement.

The stacks which may be employed to denitrate tobacco extract comprise anion permeable or neutral membranes alternating with cation permeable or bipolar membranes to form alternate brine and extract cells. The permeable membranes alternately concentrate and dilute the ionic species (particularly $K^+$ and $NO_3^-$) in the tobacco extract in contact with them. The membranes are separated by spacers which are designed and manifolded to provide uniform flow distribution of tobacco extract.

The tobacco extract flows through those alternate cells which have an anionic or neutral membrane (A) toward the anode and a cationic (C) or bipolar membrand toward the cathode, while the extracting medium or brine flows through the remaining cells. The brine is thus confined between an anion impermeable membrane toward the anode and an anion permeable membrane toward the cathode. In the event selective removal of metallic ions rather than denitration is desired, the extract would be confined between bipolar or cation permeable membranes toward the anode and cation or neutral membranes toward the cathode.

In the practice of the present process both cells adjacent the electrolyte solutions preferably contain brine. Such brine cells aid in cooling the electrolyte, thus helping to prevent hot spots in the membranes with consequent uneven denitration and deterioration of the membranes.

The cells of an electrodialysis unit are commonly fed with the appropriate brine and tobacco extract solutions through electroconductive manifolds and conduits. In the case of some commercial scale electrodialysis units, such manifolds or conduits are in contact with one and/or both of the electrodes in the electrodialysis apparatus, while the conduits and solutions provide a means for electrical current to pass directly from the electrode to the opposite electrode or electrolyte, rather than passing through the stack. In such cases of direct electrolytic contact, electrolysis may occur within the manifolds or conduits. As a result of such electrolysis, chloride ions and nitrate ions may be converted to chlorine and $NO_x$ gases respectively, while cations may react with water. The result of such electrolytic reactions is an increase in pH of the various solutions. In turn the alkaline pH causes polyvalent metallic ions, such as $Ca^{++}$ and $Mg^{++}$ to precipitate in the solubles as hydroxides, carbonates, sulfates and/or phosphates or the like thus reducing flow through the closely spaced cells due to physical blockage. Further, electrical energy is wasted on such electrolytic reactions. Finally such reactions may cause overheating of the extract with resultant overheating and deterioration of the membranes and spacers.

Such electrolysis and consequent polyvalent cationic salt precipitation can be eliminated by isolating the manifolds and conduits in such setups from contact with the electrodes. Such isolation can be effected by recessing the electrodes from contact with the manifolds and conduits and/or by insulating the electrodes from contact with the manifolds and conduits by means of nonconductive material, such as plastic.

The anions present in the tobacco extract cells, specifically the nitrate ions, migrate toward the anode upon imposition of an electric potential. Since the brine cells into which the nitrate ions migrate have an anion impermeable membrane toward the anode, the nitrate ions remain and are concentrated in the brine cells and can thus be removed from the system. Chloride ions will also migrate into the brine cells. Such chloride removal will enhance burn rate of the treated tobacco. Potassium ions may migrate in a similar manner toward the cathode upon imposition of an electrical potential if a cation permeable membrane is employed. On the other hand, the potassium ions will be retained in the tobacco extract when a potential is applied if an impermeable bipolar type membrane is employed toward the cathode.

The electrodes employed in the electrodialysis unit may be carbon, stainless steel, platinum, or other type of noncorrosive conductive material that does not react with the electrolyte and does not introduce metallic ions in solution, especially polyvalent ions such as $Cu^{++}$ and $Al^{+++}$, that may react with the ionic membrane or with the tobacco solubles and cause membrane fouling and/or scaling of the membrane surface. Preferably hastelloy carbon cathode plates and platinized niobium anode places are employed.

The solutions in the electrode cells may be different for the anode and the cathode, but preferably are the same. These electrolyte solutions should comprise an approximately 0.1 N solution of an acid and/or alkali metal salt, preferably a potassium salt of an anion that will not be reduced to gas at the electrodes or of an anion that will not foul the membranes. The anion of the catholyte must not precipitate polyvalent cations, such as $Ca^{++}$, $Mg^{++}$, $Al^{+++}$, and the like as salts or hydroxides on the surface of the membrane under acidic conditions. Electrolytes that are particularly suitable are acetic acid or its alkali metal salt adjusted to an acid pH, preferably of about 2-5, by addition of acetic acid or the like.

The purpose of the electrolyte solution is three-fold, namely to increase and maintain the conductivity of the solution, to cool the electrodes and make them more efficient conductors, and to remove the hydrogen bubbles that accumulate on the electrode surfaces. The electrolyte is continuously recirculated to an electrolyte container which is vented to allow hydrogen gas to escape thereby preventing the gas from being recirculated to the electrodes. To assist in preventing recirculation of dissolved hydrogen or accumulation of gas (hydrogen) bubbles on the electrodes a non-ionic wetting agent, such as glycerine, Triton X-100 or the like may be employed. In addition, circulation of the electrolyte at a rapid rate will facilitate removal of oxygen or hydrogen gas bubbles from the electrodes.

The membranes employed to isolate the electrodes may be of the same nature and thickness as those used in the overall stack. However, these membranes are preferably thicker, more ionic and tighter (less porous).

In the practice of the present process the cell adjacent the catholyte is provided with an anion permeable membrane toward the cathode. By means of this arrangement metallic ions are prevented from entering the catholyte while the catholyte anions which form soluble salts enter the adjacent tobacco extract or brine cell. Such transfer of the electrolyte anion insures that the brine or extract remains acidic, thus minimizing precipitation of polyvalent cation salts.

The spacers that are placed between the electrodes and the anode-cathode membranes may be of the same thickness as those used in the overall stack, but preferably they should be thicker, i.e., about twice the thickness of the remaining spacers to allow a greater circulation ratio of electrolyte on the surface of the electrodes.

FIG. 1 is a schematic diagram of an electrodialysis stack which may be utilized in the practice of the present invention and in which alternating cation and anion permeable membranes and a potassium acetate electrolyte are employed. Elements 2 depict insulation between the manifolds and the cathode. Brine flows through both cells adjacent the electrolyte solutions. However, the cell adjacent the catholyte may contain extract in which case the extract in this cell will be confined between two anion permeable membranes.

The brine solution will typically be aqueous. It is preferable that a small concentration of ionic material be present in the brine during the initial phase of operation in order to create some conductivity. Thus, for example, the brine may initially be seeded to 0.1 weight percent with potassium or sodium nitrate, chloride or acetate, or nitric, hydrochloric, or acetic acid or with potassium or sodium hydroxide. In general the initial seeding of the brine to about 0.1 weight percent should be made with ions that are water soluble and will not affect the membranes. The brine may be recirculated through the system until the extraction of nitrate ions thereby is no longer efficiently effected.

The anion permeable membranes may be neutral membranes or ionic membranes having a positive fixed electrical charge, that is anionic membranes. Positively charged membranes will attract and pass anions and repel cations and are thus anion permeable. Neutral membranes will allow either anions or cations to pass through when a voltage is applied across the ionic solution that is confined between such membranes. Cationic membranes are negatively charged and will attract and pass cations and repel anions.

Bipolar type membranes are cation and anion impermeable membranes which contain positively charged groups on one face and negatively charged groups on the other. When these membranes are placed such that the membrane surface which contains the negatively charged groups is toward the cathode and the positively charged surface is facing the anode, the anions which are attracted towards the anode are repelled by the negatively charged membrane surface and the cations which are attracted toward the cathode are repelled and neither ion is allowed to pass through. Bipolar type characteristics can be achieved with a single membrane or two membranes, one anionic and one cationic, which can be placed directly against each other to simulate a bipolar membrane.

In the practice of the present invention membranes should be employed which not only have the appropriate cation or anion selectivity, but which also have a tightness sufficient to minimize transfer of nonelectrolyte substances. Membrane tightness is a term used to describe membranes according to the amounts of nonelectrolyte substances that are transferred or accompany the ionic transfer during electrodialysis. This parameter is controlled during membrane manufacture by adjusting average pore sizes or total pore volumes. The effect of pore size in chemical separations of various substances on the basis of molecular weight is well developed and described in microfiltration, ultrafiltration or reverse osmosis technologies. In electromembrane dialysis similar effects are observed, that is, the smaller the average pore size of a membrane, the lower will be the transfer of nonelectrolytes which accompanies ion transfer from one media that contains such substances into another. On the other hand, the larger the average pore size or the total pore volume of a membrane, the less efficient a membrane will be and a greater amount of nonelectrolyte substances will transfer or accompany the ion transfer from one solution into another. Membranes having larger average pore sizes are generally less susceptible to contamination by lower molecular weight polyelectrolytes.

Another parameter commonly associated with or indicative of membrane tightness is the water content of the wet resin (membrane). Membranes that contain about $\leq 25\%$ water are considered to be very tight membranes, whereas those membranes that contain about $\geq 50\%$ water are considered to be very loose membranes. Membranes containing intermediate amounts of water are of intermediate degrees of tightness. Those membranes which contain the higher amount of water will allow a greater amount of soluble substancs of a given molecular weight to intrude into the membrane matrix, and to reach equilibrium and with such membranes a greater amount of water is transferred with the ionic species into the concentrating stream (brine compartment) when an electrical potential is applied. A greater quantity of nonionic (nonelectrolyte) substances is thus transferred into the brine or concentrating stream. Such a membrane is classified as loose while a membrane having the same porosity characteristics but containing a lesser amount of water is considered to be a tighter membrane, since a smaller amount of nonelectrolyte substances will dissolve in the water in the membrane matrix of the latter membrane and because a lower amount of water is transferred with the ionic species. In essence then, tight membranes having small pore sizes or volumes and/or low water contents are most effective in minimizing transfer of nonionic tobacco solubles into the brine cells.

The number and dimensions of the cells will depend upon the desired treatment rates, the size of commercially available membranes, the viscosity of the aqueous tobacco solubles and the need to maintain an acceptable flow rate at a pumping pressure below the rupturing point of the membranes. Other factors that determine the number and dimension of cells are the operating voltage, the amount of nitrate in the aqueous tobacco solubles, the solubles temperature, the desired degree of denitration, the resistivity of the membranes and the distance or thickness of the cells, and the desired mode of operation, viz. continuous vs. batch. Generally for a given system (voltage, nitrate level, treatment rate) with thinner, more ionic and smaller spacing between cell membranes, smaller membrane area or fewer cells will be required. Distances of $\leq 0.04$ inches have been found to be highly effective for commercially efficient systems. The same is true when the applied voltage and the solubles temperature increase, with the limiting factors on upper voltages and operating temperatures being the nature of the membranes and spacers. The temperature should be below the critical temperature for the membranes and spacers to avoid damage; the voltage should be such as to avoid electrolysis and minimize transference of other tobacco substances, ionic or non-ionic in nature and overheating of membranes and spacers.

The concentration of the tobacco extract is generally limited on the one hand by flow rate, which depends on the presence of substances that increase the extract's viscosity, and, on the other hand, by efficient denitration, which depends on the concentration of nitrate ions. Concentrations should be kept low enough to avoid membrane deposits and to permit flow without excessive resistance. As a practical matter, viscosity is the upper limit for tobacco extract concentration. At the low end of the range, the power required relative to the degree of deionization becomes the limiting factor. It has been found that tobacco extracts having been 5–50% solids and a resistivity of 8–50 ohm-cm, are suitable for use in the present process. Preferably, extracts having 10–40% solids and a resistivity of 10–45 ohm-cm are treated in accordance with the invention.

The degree to which a solution is demineralized is proportional to the electrical current flowing through the stack. The current is limited by the electrical resistance of the stack components, the conductivity of the solutions and the maximum voltage which can be applied before overheating occurs. Therefore, in solutions requiring a large amount of salt transfer, it becomes necessary to pass the solution through the stack a number of times (batch operation) or through several stacks in series (continuous) until the average nitrate concentration is reduced to the desired level.

In operation the current density in amps per square centimeter of membrane greatly depends on the ionic strength or resistivity of the tobacco extract, the membranes, the amount of voltage or potential that is being applied, the operating temperature of the stack, the cell thickness, and the resistivity imposed by a certain amount of deposit of tobacco solids on the membrane surface which again depends on viscosity and flow rates. The limiting factors for the desired voltage are the larger capital investment for cells required when the lower voltages are used and the greater transfer of nonionic species across the membranes, the greater probability of membrane "fouling" and the higher power comsumption when the higher voltage is applied. Other limiting factors are cell thickness (spacing between membranes), membrane tightness, resistance, ionic strength of the tobacco solubles and membranes and the operating temperature of the system. Voltages of between about 0.5 and 2.0 volts per cell pair permit efficient and economical denitration of tobacco extracts in accordance with the present invention.

In the practice of the present invention fouling of the membranes by polyvalent cations, such as magnesium or calcium, and their resultant loss from the extract, is minimized since the pH of the tobacco extract is kept on the acid side by preventing electrolysis and use of an electrolyte whose anion forms soluble salts with polyvalent cations in conjunction with an anion permeable membrane adjacent the catholyte. By these means water soluble magnesium and calcium salts are maintained in solution, thus preventing the cations from being converted into insoluble hydroxides, carbonates or the like which may deposit on the membrane surface and causing scaling.

By rapidly circulating the extract and employing a small membrane spacing and tighter membranes with application of sufficient current (0.5 to 2.0 volts/cell pair) in the present process, the most mobile ions, such as nitrate, are extracted while less mobile ions are flashed out of the cells thereby avoiding their embedding into the membrane pores. Also, the more mobile ions will displace such ions as calcium, magnesium, citrate and the like even from ionic membranes.

Figure 2:
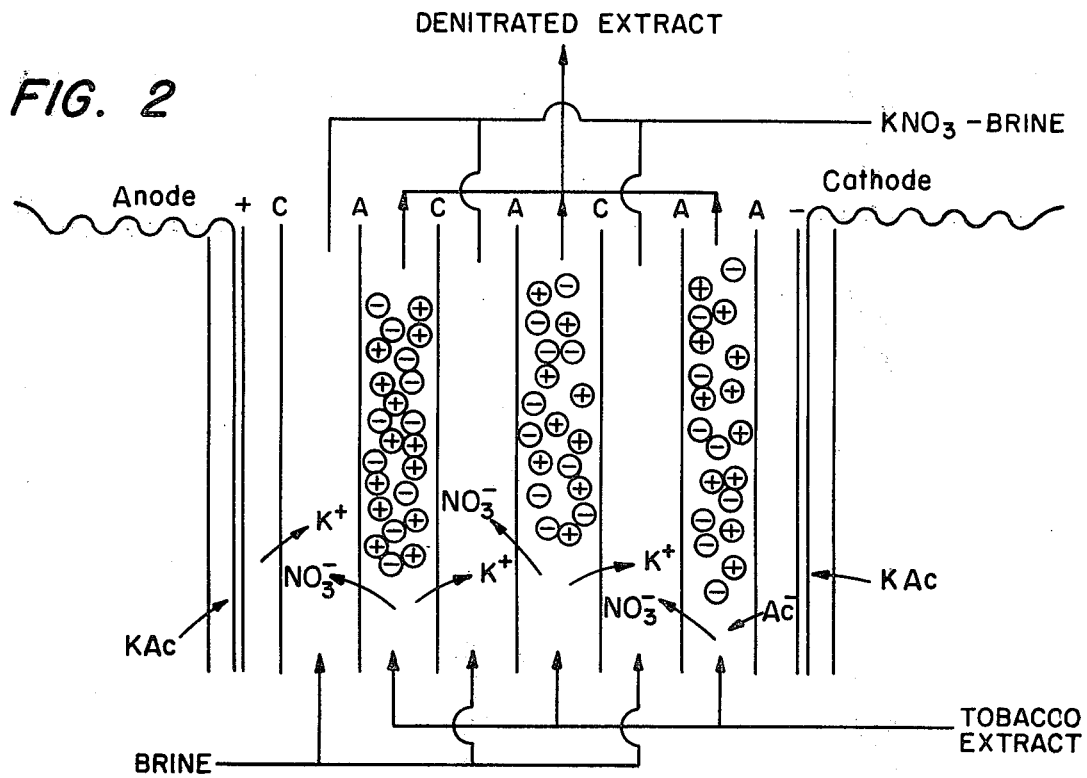
FIG. 2 is a schematic diagram of a membrane electrodialysis stack employing electro-regenerated ion exchange resins.
Figure 3:
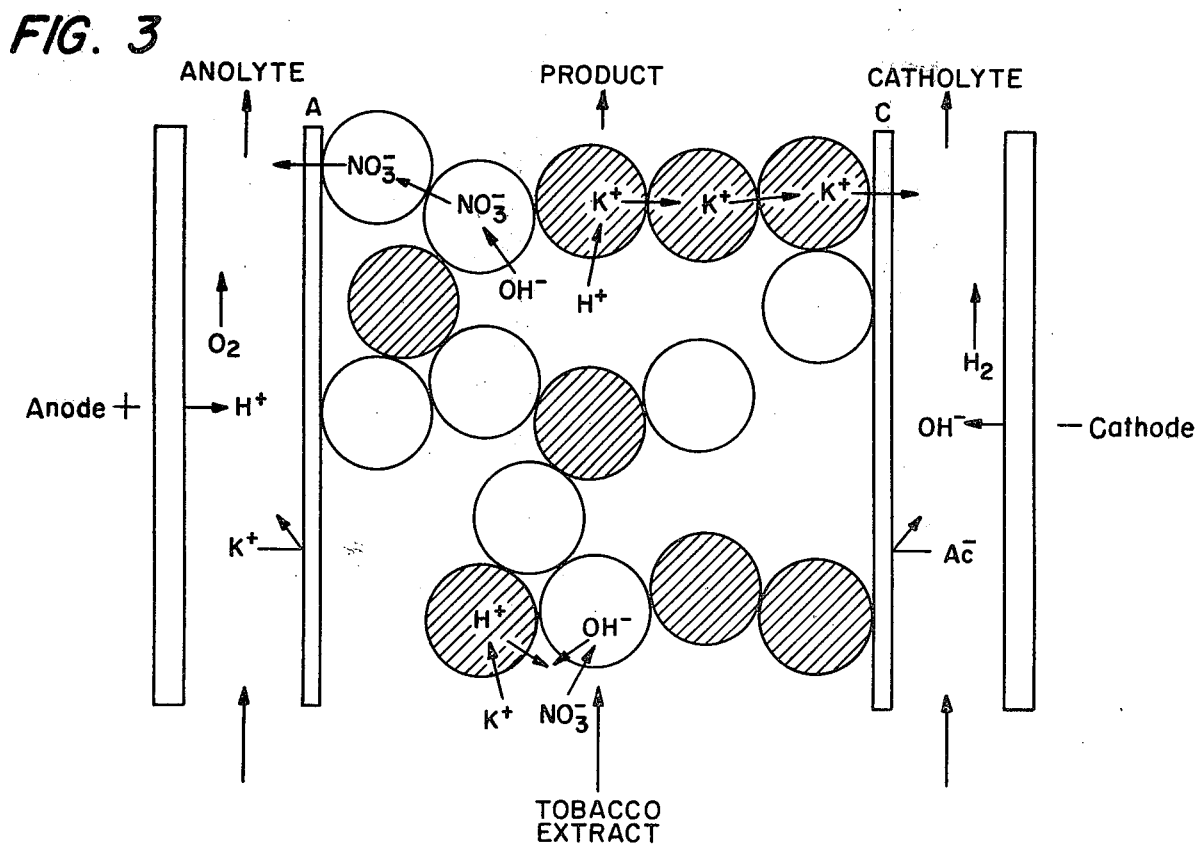
FIG. 3 is a schematic diagram of the mechanism of a cell in an electrodialysis stack employing electro-regenerated ion exchange resins.

When very dilute streams are to be deionized and to reduce membrane fouling and energy requirements, that is, avoid electrolysis, the efficiency of the process is enhanced in a system using ion exchange resins and membrane electrodialysis. This is called electroregenerated ion exchange deionization. The setup is the same as membrane electrodialysis except for the addition of a mixed bed of weak ion exchange or ionic resins to each cell through which the tobacco solubles are to be passed. The dilute solution of ions to be deionized enters the cells that contain the mixed bed of resins. The ions are "trapped" or picked up by the resins causing an increase in ionic concentration and electroconductivity between the electrodes of the electrodialysis cell and thus a lesser amount of electrical power is required. The applied electrical potential causes the anions to transfer through their respective membranes into the brine cells where they are concentrated and removed. The mixed bed of the weak ion exchange resins is continuously regenerated without interruption and without the use of high amounts of additional chemicals or additional power as in the case with standard ion exchangers. The mixed bed of weak ion exchange resins may be composed of a single resin having both negative and positive groups, two different resins, one anionic and one cationic, in bed or "spacer" type form. The spacer form may be in a basket or wire cloth type weave or in film form (similar to bipolar membranes) specially manifolded to allow flow. FIG. 2 is a schematic diagram of the above-described electro-regenerated ion exchange deionization employing a cationic and an anionic membrane, potassium acetate electrolyte solutions and cationic (+) and anionic (−) exchange resins, wherein the cell adjacent the catholyte contains extract. FIG. 3 depicts the mode of operation in a cell of an electrodialysis stack of the type depicted in FIG. 2.

In order to further minimize loss of solubles other than nitrate salts, extraction of the tobacco material may be effected with denitrated tobacco extracts. By means of this expedient it is possible to reduce the amount of non-nitrate materials removed from the tobacco since after several extractions the extract liquor will approach saturation. Thus, except for the nitrates, reduced amounts of materials will be removed during subsequent extraction steps. This is a preferred mode of operation for treating tobacco strip or tobacco components intended for use in reconstituted tobacco.

It may be desirable to treat the brine solution generated during the electrodialysis process to recover potassium nitrate in a relatively pure form and/or to recover the small amounts of low molecular weight organic substances lost during electrodialysis. To accomplish this, several approaches are possible. For example, the electrodialysis brine may be concentrated from about 8–10% to >30%, preferably to >40% solids, by evaporation. Thereafter crystallization may be employed to separate the $KNO_3$ from the $KCl$ and organic solubles in the brine utilizing the different solubilities that the two salts exhibit at various temperatures. Alternatively following the concentration of the electrodialysis brine solids by evaporation, the salts, primarily $KNO_3$ and $KCl$, may be precipitated by adding a solvent, such as ethanol to the concentrated brine. The brine may then be cooled and filtered/centrifuged to recover the solvent and other tobacco solubles for reapplication to extracted tobacco.

Ion exchange of the brine to remove nitrate selectively using specific ion-exchange resins that show a greater selectivity for nitrate than chloride or other ions might also be used. Such specific ion-exchanging substances could be the alkylated amidines reported in *J. Inorganic Nuclear Chemistry*, Vol. 36, pp. 391–398 (1974) to exhibit a selectivity for nitrate over chloride of the order of 20 to 1. These materials show even higher selectivities for nitrate over sulfate and bicarbonate. It is also possible that electrodialysis membranes or spacers could be fabricated of such substances thereby effecting a more selective denitration of tobacco solubles. Fermentation processes could also be used to remove the nitrate present in the electrodialysis brine. In this case, the treated brine could be recovered and reapplied to the denitrated tobacco solubles and tobacco.

It is to be understood that the process of the invention may be employed with whole cured tobacco leaf, cut or chopped tobacco, tobacco filler, reconstituted tobacco, tobacco stems, stalks and the like. As used herein, references to tobacco and tobacco materials are to be understood to include all such forms of tobacco. Further it is to be understood that the tobacco treated in accordance with the invention exhibits reduced nitrogen oxide delivery in any tobacco product which is consumed by combustion and that references to smoking tobacco products include, cigars, cigarettes, cigarillos, etc.

The following examples are illustrative of the invention:

EXAMPLE 1

Several 150–200 gallon batches of aqueous tobacco extract liquor containing 18% soluble solids and 0.3% $NO_3^-$-N were denitrated by electrodialysis to below 0.02% $NO_3^-$-N. The membranes used were Ionics Corp.'s anion/cation permeable membranes. Specifically 61CZL183 cation permeable were paired with 103QZL 183 anion permeable membranes. These anion permeable membranes are about 0.63 mm thick, contain about 36 weight percent water and comprise crosslinked copolymers of vinyl monomers and contain quaternary ammonium anion exchange groups and are homogeneously film cast in sheet form on a reinforcing synthetic fabric composed of modacrylic polymer. The cation permeable membranes are about 0.6 mm thick, contain about 40 weight percent water and comprise crosslinked sulfonated copolymers of vinyl compounds which are also homogeneously film cast in sheet form on synthetic reinforcing fabrics. The spacers were 0.04". The dimensions of the membranes were 40"×18", and each membrane had an effective area of 3.2 ft.$^2$ The electrodialysis unit used had a double stack, each of which contained an electrolyte cell adjacent to each electrode and 100 tobacco solubles cells alternating with 101 brine cells. The brine cell adjacent the catholyte was confined between two cation permeable membranes. The anolyte and catholyte were both a water solution of $H_2SO_4$ at pH of 2-3. The electrodes used were platinum-niobium, stainless steel.

The flow rate of tobacco solubles through the unit was 100 gallons per minute and their temperature was maintained at 40°±2° C. by chilling the circulated brine with chilled water and a heat exchanger. The denitration was carried out by the imposition of 75 volts across the electrodes of each stack or 0.75 volts per cell pair.

Under the above conditions the current density (amps/ft.$^2$) was about 20 and the flow rate through the unit was 100 gallons per minute at first. With time (8-24 hours) the flow rate and current dropped to 70 gallons/minute and 10 amps/ft.$^2$ respectively, indicating physical fouling of the system. The run was then terminated and the unit was flushed with water (forwards or backwards) to remove any solid material that may have blocked individual brine and/or tobacco solubles cells. Then the denitration of tobacco solubles were repeated. Both values, flow rate and amps/ft.$^2$, increased, although not to the original values. At this point the ED unit was flushed with water and was opened for a visual inspection. It was discovered that there was a significant amount of solid debris in the tobacco solubles and brine manifolds and conduits. Most of this debris had accumulated at the entrance and exit of the electrodialysis stack manifolds as a dense mass adhered to the walls of the manifolds and very close to the cathode plates at the points of entrance and exit of the tobacco and brine solubles. It was noticed that the cathode plates at these points were protruding into the manifolds to the tobacco and brine solubles rather than being recessed and insulated from coming into direct contact with these solutions as in some units. On analysis, it was noted that the solid "debris" had a pH higher than 8.5 wereas the entering/exiting tobacco solubles and brine were at a pH of less than 6.5 It was also shown that the "debris" contained a very high amount of $Ca^{++}$, $SO_4^{--}$ and $PO_4^{---}$ ions.

At this point, the cathode plates protruding into the manifolds of the unit were recessed and insulated with a non-conductive plastic material. Denitration of the tobacco solubles under conditions previously described was continued without any accumulation of "debris" or loss of flow rate and current density due to physical fouling.

EXAMPLE 2

Example 1 was repeated with the isolated electrodes except that a thick anion permeable membrane was used adjacent the catholyte in order to modify the brine cell adjacent to the catholyte and reduce the electrolytic conditions that exist in that cell. When this change was made in Example 1, the entire surface facing the brine of the anion permeable membrane (A) adjacent the catholyte was coated with a solid, white precipitate and flow through this brine compartment was interrupted. Both membranes that confined this last brine cell appeared to be damaged (overheated). Chemical analysis showed that the precipitated white coating and material in this brine cell adjacent the $H_2SO_4$ catholyte was scale formation of $CaSO_4$.

To eliminate this scaling acetic acid (ph=3) and/or K-acetate (pH=3) was used. With this adjustment the denitration run of Example 2 proceeded very smoothly and without any evidence of fouling or membrane damage.

What is claimed is:

1. A method for denitrating aqueous tobacco extracts which comprises circulating an acidic tobacco extract having a solids content of about 5-50% and a resistivity of about 8-50 ohm-cm through the alternate cells of an electrodialysis unit having an anion permeable membrane toward the anode spaced no more than about 0.04 inches from an anion impermeable membrane toward the cathode, said membranes having a tightness sufficient to minimize transfer of nonelectrolyte substances, while circulating brine through the remaining cells and applying about 0.5 to 2.0 volts/cell pair to the unit, characterized in that the electrodes are isolated from all elements of the unit which are in direct electrolytic contact with the opposite electrode, the cell adjacent to the cathode has an anion permeable membrane toward the catholyte and an electrolyte the anion of which forms soluble salts with polyvalent cations is employed.

2. The method of claim 1 wherein the tobacco extract cells contain mixed beds of resins selected from the group consisting of ion exchange and ionic resins.

3. The method of claim 1 wherein the aqueous tobacco extract has a solids content of about 10-40% and a resistivity of about 10-45 ohm-cm.

4. The method of claim 1 wherein an electrolyte comprising an acetic acid/acetate solution is employed.

5. The method of claim 1 which further comprises circulating brine solution through the cells adjacent both electrolytes.

6. The method of claim 1 wherein the brine solution contains at least 0.1 weight percent ionic material.

7. A method for denitration of tobacco which comprises:
(a) forming an aqueous tobacco extract having a solids content of about 5-50% and a resistivity of about 8-50 ohm-cm;
(b) denitrating the extract by circulation through those cells in an electrodialysis apparatus which comprise an anion permeable membrane having at least intermediate tightness toward the anode spaced no more than about 0.04 inches from an anion impermeable membrane having at least intermediate tightness toward the cathode and which alternate with brine cells in an electrodialysis stack while applying about 0.5 to 2.0 volts/cell pair; and
(c) combining the denitrated extract with insoluble tobacco residue from which solubles have been extracted; characterized in that the electrodes are isolated from electrolytic contact with each other, the cell adjacent the catholyte having an anion permeable membrane toward the cathode and the electrolyte containing a salt, or acid the anion of which forms soluble salts with polyvalent cations.

8. The method of claim 7 wherein the aqueous tobacco extract is formed by contacting a tobacco material with a denitrated aqueous tobacco extract containing tobacco solubles and separating the aqueous extract from the insoluble tobacco residue.

9. The method of claim 7 which further comprises circulating brine solution through the cell adjacent both electrolytes.

10. The method of claim 7 wherein the tobacco extract is centrifuged prior to denitration.

11. The method of claim 7 wherein the tobacco extract is filtered prior to denitration.

* * * * *